United States Patent

[19] Preller

[11] Patent Number: 5,892,672
[45] Date of Patent: Apr. 6, 1999

[54] LOW LOSS DIGITALLY CONTROLLED VOLTAGE CONVERTER

[75] Inventor: Peter Preller, München, Germany

[73] Assignee: Siemens Aktiengesellschaft, Munich, Germany

[21] Appl. No.: 983,608

[22] PCT Filed: Jun. 24, 1996

[86] PCT No.: PCT/DE96/01112

§ 371 Date: Dec. 29, 1997

§ 102(e) Date: Dec. 29, 1997

[87] PCT Pub. No.: WO97/02648

PCT Pub. Date: Jan. 23, 1997

[30] Foreign Application Priority Data

Jul. 4, 1995 [DE] Germany ............ 195 24 408.7

[51] Int. Cl.⁶ ............................................. H02M 7/539
[52] U.S. Cl. ............................................. 363/97; 363/21
[58] Field of Search ............................ 363/15, 16, 20, 363/21, 95, 97

[56] References Cited

U.S. PATENT DOCUMENTS

| | | | |
|---|---|---|---|
| 4,984,145 | 1/1991 | Daugschat et al. | 363/19 |
| 5,325,282 | 6/1994 | Bansard | 363/21 |
| 5,684,685 | 11/1997 | Komatsu et al. | 363/95 |

FOREIGN PATENT DOCUMENTS

| | | | |
|---|---|---|---|
| 0 380 033 | 1/1990 | European Pat. Off. | H02M 3/335 |
| 2179271 | 7/1990 | Japan | H02M 3/28 |
| 4127872 | 4/1992 | Japan | H02M 3/28 |

OTHER PUBLICATIONS

U.Tietze–Ch. Schenk—Halbleiter–Schaltungstechnik—p. 561–576 Dec. 1990.

Patent Abstracts of Japan—E–1231 Jul. 10, 1992, vol. 16,/No. 316, 4–87556.

Patent Abstracts of Japan—E–892, Feb. 21, 1990 vol. 14/No. 95,1–298958.

Patent Abstracts of Japan—E–1078—Jun. 18, 1991 vol. 15/No. 236—3–70464.

*Primary Examiner*—Jeffrey Sterrett
*Attorney, Agent, or Firm*—Hill & Simpson

[57] ABSTRACT

In a voltage converter for producing a controlled output voltage from an input voltage, particularly in an isolating-transformer switch-mode power supply, a digitally realized control circuit is provided. This circuit contains a counter apparatus whose counter state is compared with a digital comparison value derived from the output voltage to be controlled. The pulse-width-modulated driving of a switching element coupled with an inductive element is carried out dependent on the result of the comparison and on a signal indicating the state of demagnetization of the inductive element. By means of a further comparison value for comparison with the counter apparatus, a turn-on blocking voltage is produced for the switching element, in order to raise the switching frequency for standby operation.

10 Claims, 2 Drawing Sheets

LOW LOSS DIGITALLY CONTROLLED VOLTAGE CONVERTER

BACKGROUND OF THE INVENTION

The invention relates to a voltage converter for producing a controlled output voltage from an input voltage.

Voltage converters are well known in the prior art, and are described in their various constructions as step-down transformers, step-up transformers, isolating transformers, etc., in Tietze, Schenk: "Halbleiterschaltungstechnik," 9th ed., 1990, pp. 561 to 576. In voltage converters of this sort, a switching element is connected with an inductive element, e.g. a coil or the primary winding of a transformer, in order to apply an input voltage, which can be a rectified alternating voltage, pulse-by-pulse to the inductive element. Dependent on a control circuitry, the switching element is clock-controlled in pulse-width-modulated fashion in such a way that an output voltage with a desired characteristic is present. The controlled output voltage is normally supposed to be a voltage that is as constant as possible and is present in load-independent fashion.

The control circuit required for controlling the switching element is normally realized as an integrated circuit with external wiring elements for signal production and preparation. The integrated control module TDA 4605 from Siemens is suited for use as a control IC for isolating-transformer switch-mode power supplies. The signal processing in the TDA 4605 is carried out with analog circuit technology. This circuit technology has the advantage that a relatively small number of transistors is required, but has the disadvantage of difficult dimensioning and high sensitivity to disturbances in relation to operational fluctuations and the influence of parasitic elements.

In the reference Patent Abstracts of Japan, 1991, vol. 15, no. 236, (E-1078), JP 3-70464, a switching controller with a digitally operating controlling is specified. The control circuit contains a counter driven by an oscillator a counter state of which is compared with a comparison value. A switching element provided in the switching controller is controlled dependent on the comparison result. The comparison value is provided by a bidirectional counter whose bidirectional counter input is driven by a comparator, by means of which the output voltage to be controlled is compared with a reference value.

In Patent Abstracts of Japan, 1992, vol. 16, no. 316 (E-1231), JP 4-87556, a free-wheeling switch-mode power supply with a digitally operating controlling is specified, in which an operational counter, clock-controlled by an oscillator, is reset by a feedback signal derived from a transformer winding. By this means, the turn-off time of the switching transistor is matched to the resonance frequency of the transformer.

In Patent Abstracts of Japan, 1990, vol. 14, no. 95 (E-892), JP 1-298958, a switch-mode power supply is described whose control circuit contains a CPU.

The previously known digitally operating power packs are operated with unaltered functioning for low load at the output side (standby), and provide no particular circuit means that take this operational state into account. A low power loss of the power pack is desirable in standby operation in particular.

SUMMARY OF THE INVENTION

An object of the invention is to provide a voltage converter of the type named above that has a lower power loss in low load operation.

According to the present invention, a voltage converter is provided for producing a controlled output voltage from an input voltage. An inductive element is connected between an input circuit and an output circuit. The inductive element is also connected with a switching element for pulse-by-pulse application of the input voltage to the inductive element. A control circuit is provided for driving the switching element for controlling the output voltage. The control circuit has a digital counter unit having an output signal which is compared with a digital comparison value derived from the output voltage so that, dependent on a comparison result, the switching element is turned off. The digital comparison value derived from the output voltage is indicative of a state of demagnetization of the inductive element. A further comparison value is provided generated by a comparison counter. This further comparison value is also compared with the output signal of the digital counter unit during determination of a low load operation and determination of a state of demagnetization. The result of this comparison is then employed so that turning on of the switching element is first blocked and then released, dependent on the comparison result of the further comparison value with the output signal of the digital counter unit.

In the voltage converter of the invention, the control circuitry for driving the switching element are realized completely in digital circuit technology. The digital control circuit thus has a precise, predictable behavior. Its functioning is largely insensitive to disturbance. Disturbing influences, which would lead to sensitive disturbances in operation given an analog circuit realization, can fluctuate within wide limits in the digital realization. This holds for example for the fluctuations of the supply voltage, parasitic circuit elements, temperature influence, etc. As an essential element, the digital control circuit contains a counter apparatus, with which time segments required for the controlling process are determined by [ . . . ] a comparison with a comparison digital value coupled to the output voltage.

In an isolating-transformer switch-mode power supply, the switching element will be turned on and off, dependent on a characteristic signal portion, when the counter apparatus reaches the comparison value derived from the output voltage. In this way, the output voltage is kept constant. As a characteristic signal portion, a signal portion is chosen that indicates the demagnetization of the transformer. This is for example the zero crossing of a transformer voltage, which indicates that the magnetic energy contained in the transformer of the isolating-transformer switch-mode power supply has been completely emitted from the primary side to the secondary side.

For the provision of the digital comparison value, a counter can be used that is counted by a predetermined increment in each switching period, dependent on the output voltage. The direction of counting is thereby determined by the position of the output voltage to a target value. By means of this technique, a delay is inserted into the control circuit, so that oscillations of the controlling are damped.

The counting increment can preferably be modified dependent on the output voltage.

At the output side, the control circuit usefully comprises a memory element that is set with the zero crossing of the transformer voltage, so that the switching element is turned on, and is reset, when the comparison digital value is reached by the counter apparatus.

By means of a further comparison digital value, which in turn can be provided by a bidirectional counter, further time periods can be determined within a switching period of the transformer, in order to take into account particular operating conditions of the voltage transformer. Advantageously, some zero crossings of the transformer voltage, which would otherwise cause the switching element to be turned on, are ignored during a low load operation (standby). By this means, the switching frequency of the voltage converter is lowered. Since the power loss of the voltage converter depends essentially on switching losses, caused mainly in the switching element, the efficiency, and the power loss consumed, is lowered during low load operation.

The invention is explained below on the basis of the exemplary embodiment shown in the drawing.

DESCRIPTION OF THE PREFERRED EMBODIMENTS

Figure 1:
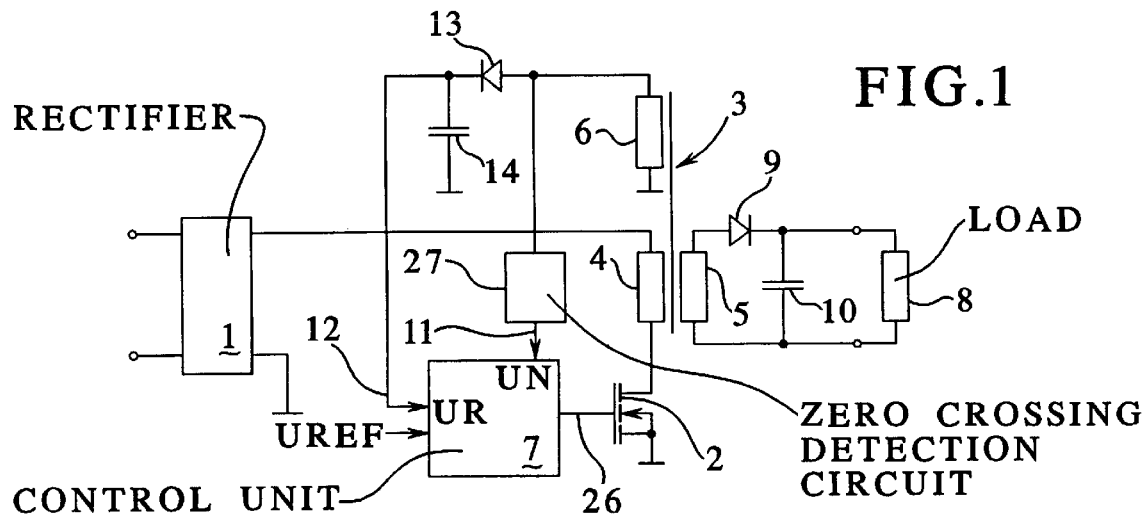
FIG. 1 shows a block diagram of an isolating-transformer switch-mode power supply with a digital control circuit.

The isolating-transformer switch-mode power supply according to FIG. 1 comprises a rectifier 1 at the input side, preferably a bridge rectifier, to which an input alternating voltage can be supplied. The rectified alternating voltage is present at the output of the rectifier 1. At the output of the switch-mode power supply, a load 8 is supplied by a controlled constant voltage that is to be produced. A switching transistor 2 is connected in series to the primary winding 4 of a transformer 3. By means of the turn-on and turn-off phases of the switching transistor 2, the rectified alternating voltage emitted by the rectifier 1 is applied pulse-by-pulse to the primary winding 4 of the transformer 3. A digitally realized control unit 7 provides the pulse-width-modulated driving of the switching transistor 2 in such a way that the constant controlled output voltage is present at the load 8 in a manner which is as independent of load fluctuations as possible. For this purpose, the voltage of the control circuit 7, which voltage is present at a further winding 6 of the transformer 3, is supplied to a terminal 11, and is supplied to a terminal 12 via a rectifier diode 13 and a smoothing capacitor 14 for rectification.

Figure 4A:
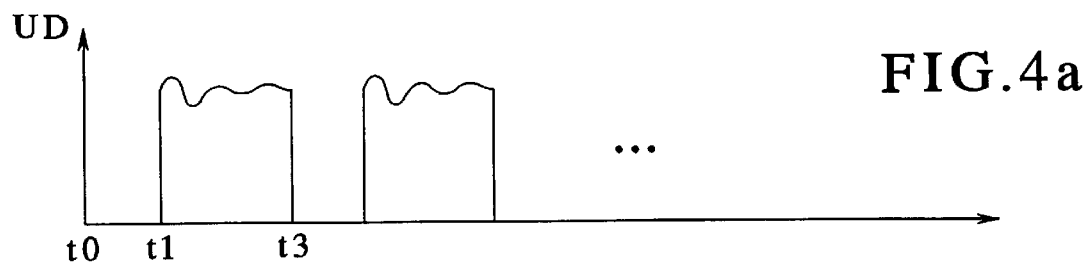

The circuit shown in FIG. 1 operates according to the following. Reference is thereby made to the signal curve diagram shown in FIG. 4(a), of a switching period of the switch-mode power supply for normal operation. At time t0, the switching transistor is turned on. Its drain terminal is drawn to ground potential, so that the voltage emitted by the rectifier 1 is present at the primary winding 4. As is known, the current flowing through the primary winding 4 climbs in a linear fashion with time. At time t1, the switching transistor is turned off. The turn-on phase t0–t1 of the switching transistor arises in load-dependent fashion, dependent on the signal present at the terminal 12 of the control circuit 7. Between times t1 and t3, the switching transistor is turned off, so that the magnetic energy stored in the transformer 3 can be emitted to the load 8 via the secondary winding 5 of the rectifier by means of the diode 9 and the capacitor 10. When the energy stored in the transformer is emitted completely to the secondary winding, the voltage present at the control winding 6 becomes zero. This is communicated to the control circuit 7 at the terminal 11, so that the switching transistor 2 is turned on again at time t3. The turn-on duration, t0–t1, is set by the control circuit 7 in such a way that, as much as possible, a constant voltage independent of load fluctuations is adjacent to the load 8.

Figure 2:
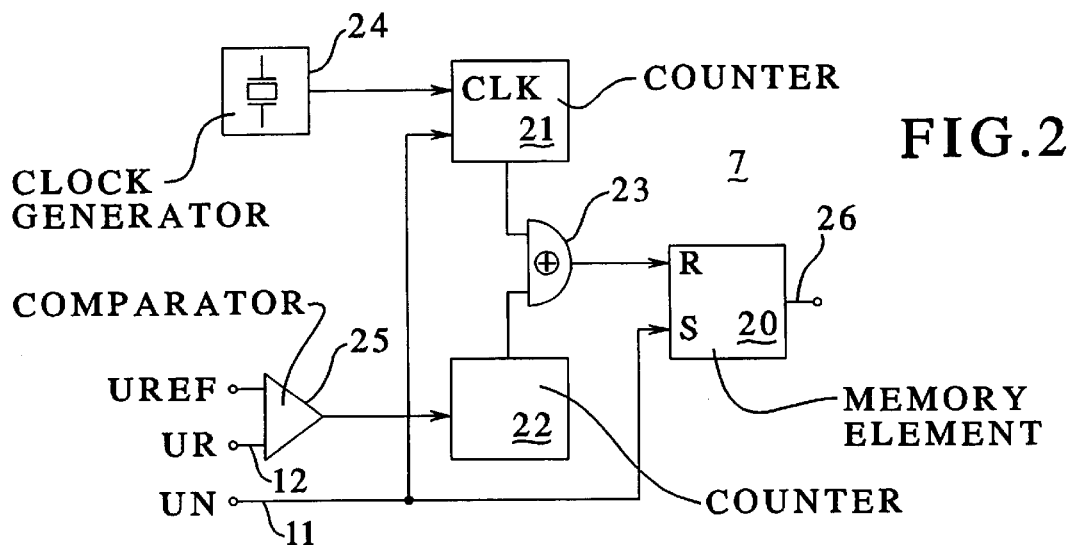
FIG. 2 shows the circuit design of the digital control circuit.

For the controlling of the turn-on and turn-off phases of the switching transistor 2, the control circuit 7 has the design shown in FIG. 2. A memory element 20 is set by the zero crossing signal UN (setting input S of the memory element 20), so that the switching transistor 2 connected at its output terminal 26 is turned on. The zero crossing signal UN is derived from the signal present at the terminal 11 by means of known circuit techniques for zero crossing detection. In addition, a counter 21 is reset by the zero crossing signal UN. The counter 21 is clock-controlled by a clock generator 24 at the terminal CLK, so that it continually counts upward. In the unit 22, a digital value derived from the output voltage to be controlled is stored. In a comparison unit 23, which contains exclusive OR gates, the counter state of the counter 21 is compared with the comparison value in the unit 22. Given a positive comparison, the memory element 20 is reset at the reset input R, so that the switching transistor is turned off. The digital value of the apparatus 22 can for example be obtained by means of direct analog-digital conversion of a voltage proportional to the output voltage. Preferably, a bidirectional counter is provided in FIG. 2 for the unit 22, the bidirectional counting input of which is driven by a comparator 25. By means of the comparator 25, the control voltage UR fed to the terminal 12 is compared with a reference value UREF. The reference value UREF corresponds with the output voltage to be controlled of the switch-mode power supply to the load 8.

If the control voltage UR is greater than the reference voltage UREF, the counter 22 is counted downward with a predetermined step width. During a switching period of the switch-mode power supply, which comprises a turn-off phase and a turn-on phase of the switching transistor, only one counter pulse is carried out in the counter 22. If the reference voltage UR is smaller than the reference voltage UREF, the counter 22 is counted upward by a step width. In this way, it is achieved that the output voltage to be controlled of the switch-mode power supply fluctuates about the target value. This control design corresponds to a proportional controller. The step width for upward and downward counting is chosen relatively small in order to insert a sufficient time constant into the control circuit, so that the oscillation tendency of the controlling is damped. For a control behavior in accordance with practice, a frequency of the oscillator 24 of 8 MHz has proven suitable. The turn-on duration t0–t1, of the switching element 2 is thus modified by means of the comparison counter 22 in time steps that are small enough that transformer noises are avoided.

It is advantageous to select the step width dependent on the operating state. Given a change of state at the output of the comparator 25, the step width is larger than when no change of state has immediately preceded. By this means, it is achieved that when the output voltage falls above or below the target value, a rapid correction is carried out in the form of a relatively large adjustment of the turn-on time of the switching transistor. Otherwise, the adjustment is small. In practice, it has proved advantageous to count the counter 22 up or down by ±4 step widths immediately after a change of state of the output signal of the comparator, by ±3 in the subsequent switching periods, then ±2, and subsequently by ±1 step widths. The control characteristic of the control circuit is hereby that of a proportional integral controller, so that the remaining control deviation is smaller.

These indicated functional blocks can be realized as such in an integrated circuit, which also holds for the subsequent further indicated developments. They can also be realized using a microprocessor architecture in which the functions of the blocks are executed in software-controlled fashion. A realization in the form of a state switching mechanism (finite-states machine) would also be conceivable.

Figure 3:
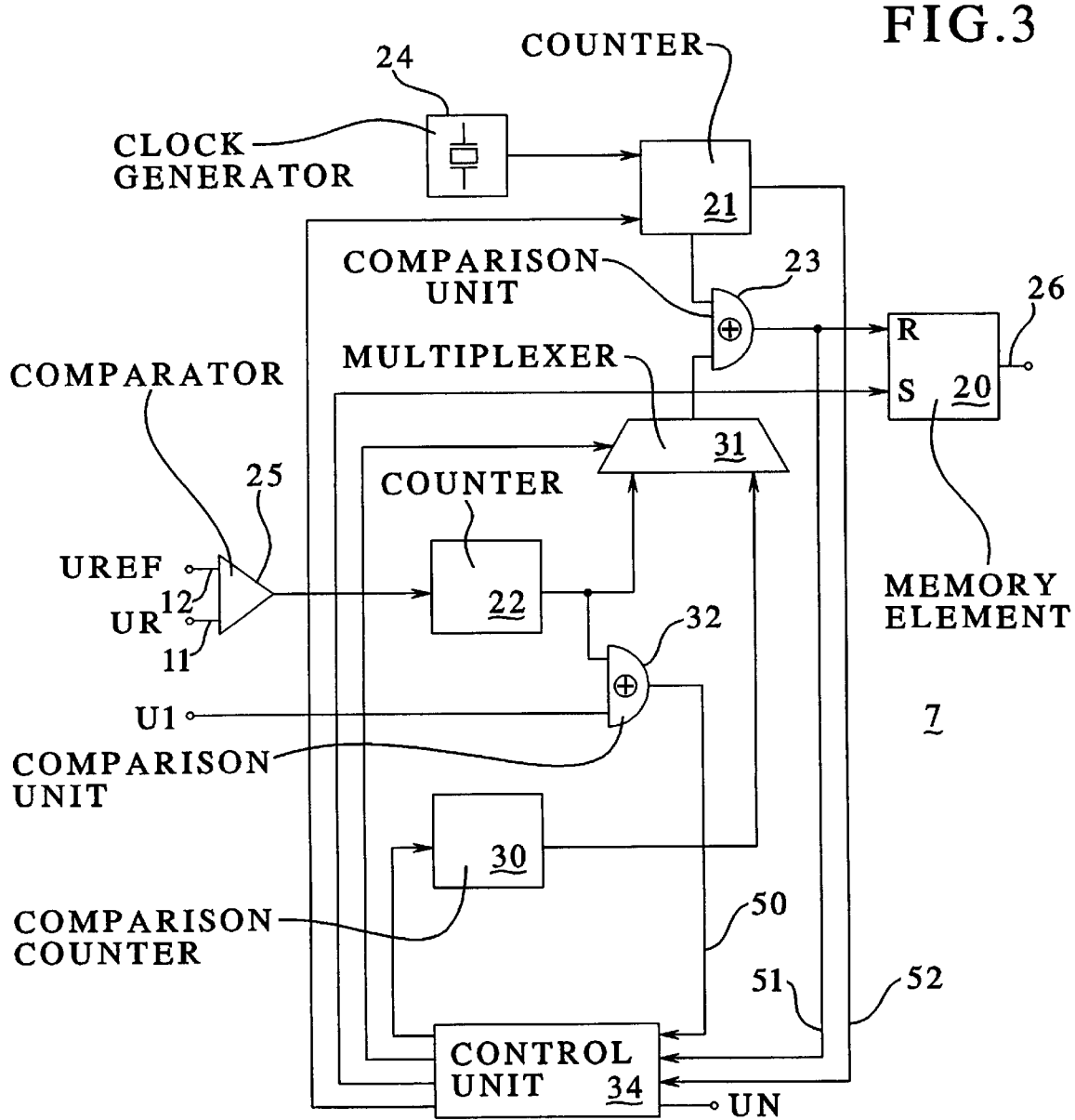
FIG. 3 shows a development of the design of FIG. 2, and FIGS. 4(a) and (b) show signal curve diagrams of a switching period of the switch-mode power supply in normal operation and in low load operation.

FIG. 3 shows a development of the design shown in FIG. 2 of the digital control circuit 7. Corresponding elements are provided with identical reference characters. In contrast to the realization according to FIG. 2, the circuit according to FIG. 3 contains a further comparison counter 30, which can be connected, alternatively, to the output of the comparison counter 22, with the comparison unit 23 via a multiplexer 31. In addition, a further comparison unit 32 is provided by means of which the counter state of the counter 22 can be compared with a respective comparison value U1. The comparison value U1 can be fed in digitally, but preferably in analog fashion, e.g. via a voltage divider the output signal of which is analog-digital converted. The latter is useful because the control circuit 7 is at the primary side of the switch-mode power supply, and hardly any other digital signal processing apparatuses are present there. Moreover, a control unit 34 is provided to which the outputs of the comparison unit 32, of the operational counter 21, and the zero crossing signal UN can be supplied, and which contain therefrom control signals for setting the memory element 20, for resetting the operational counter 21, for bidirectional counting of the comparison counter 30 and for switching over of the multiplexer 31.

Figure 4B:
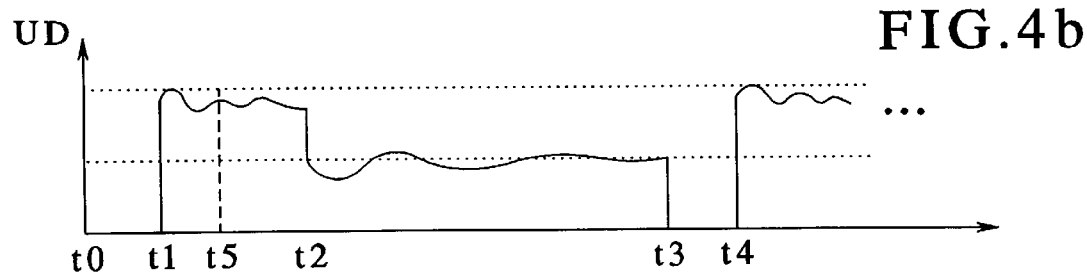

The function of the circuit shown in FIG. 3 is now specified with reference to the signal curve shown in FIG. 4(b) of the drain voltage UD of the switching transistor 2 during a switching period. During low load operation (standby), it is advantageous, for the reduction of power loss, to reduce the switching frequency of the switch-mode power supply. For this purpose, the turning on of the switching transistor is prevented for a series of zero crossings of the transformer voltage. This is shown in FIG. 4(b) between the times t2–t3, whereby the drain voltage UD carries out a free oscillation that oscillates about the voltage present at the positive output terminal of the rectifier 1. The corresponding oscillation is present at the control winding 6 and at the input 11 in relation to ground, so that zero point crossings can be detected there.

For the production of the masking time t2–t3, the low load operation is determined by means of the comparator 32. For this purpose, the counter state of the comparison counter 22 is compared with the comparison value U1. If the counter state of the counter 22 falls below the comparison threshold U1, this means that the secondary output voltage is relatively high, and lies far above the target voltage at the output side (which corresponds to the reference voltage UREF). Since the output load 8 is low, the energy transmitted to the secondary side is not consumed completely. The determination of the low load operation is communicated to the control apparatus 34 at the terminal 50. Thereupon (time t2), the comparison counter 30, which up to this point was reset to zero, is counted upward by one counting step. In addition, the operational counter 21 is reset, and the multiplexer 31 is switched over to the comparison counter 30, in order to enable determination of the time period t2–t3. If the operational counter reaches the further comparison value of the comparison counter 30 at time t3, this is communicated to the control apparatus 34 at the terminal 51, so that, in turn, a turn-on process of the switching transistor can take place. For this purpose, the multiplexer 31 is switched over to the comparison counter 22, and the operational counter 21 is in turn reset as at time t0. Since the output voltage has sunk due to the masking time t2–t3, the comparison counter 22 is again counted upward by a step width, so that the turn-on time t3–t4 is slightly longer than the previous turn-on time t0–t1. The turn-on time of the switching transistor 2 is thus prolonged in low load operation, while the turn-off time is likewise lengthened. Overall, there results a reduction of the switching frequency, and thus a reduction of the frequency-dependent power loss.

In subsequent switching periods during the low load operation, the masking time t2–t3 is increased, and in addition the corresponding turn-on time is increased until the output of the counter 22 exceeds the comparison value U1, so that the counter state of the second comparison counter 30 is again counted downward by the step width predetermined for it, so that the masking time t2–t3 is again reduced. In the steady-state condition, there then results an equilibrium in which the turn-on time of the switching transistor and the masking time for the zero crossings arises in such a way that the output voltage at the load 8 is constant.

The threshold U1 for the first comparison counter 22, with which the second comparison counter 30 can be connected to produce the masking time t2–t3, preferably comprises a first, higher threshold value—the second comparison counter 30 is counted upward when this threshold value is exceeded—and a second, lower threshold value, at which the second comparison counter 30 is counted downward. By this means, a hysteresis effect is achieved, the controlling of the masking time t2–t3 in low load operation becomes more inert and more stable overall, which reduces the tendency to oscillation. By this means, oscillation superpositions, which would be audible, can be avoided.

The digital circuit design shown in FIG. 3 enables, in a simple way, some further developments of the invention. For example, a further comparator (not shown) can be provided, by means of which the counter state of the second comparison counter 30 can be monitored for the exceeding of a further comparison value, which can be communicated to the control means 34 at a terminal. It is thereby recognized that the masking time t2–t3 is relatively large. A burst operation can be activated dependent on this. This means that during a certain time period the switch-mode power supply is completely blocked, and runs during a further time period in normal operation or low load operation. The blocking and operational time can be coupled to the phase of the alternating voltage at the input side. For the counting of the blocking time, a further counter is provided. Preferably, this counter is connected downstream from a bit in the output of the operational counter 21, in order to use this counter as a prescaler.

An overvoltage and overload protection can be realized in such a way that a further counter (not shown) is provided that is counted upward upon each upward count impulse or, respectively, downward count impulse emitted by the comparator 25 for the first comparison counter 22, and is reset upon a change of state of the comparator 25. This additional counter sees to it that an underload or, respectively, overload, e.g. an excessively high voltage at the output side in case of underload or an excessively high output current in case of short-circuit, is recognized.

Immediately after the turn-off time t1 of the switching transistor 2, undesirable zero crossings can occur due to overshooting, as is known. In order to prevent such a zero crossing from causing a turning on of the switching transistor 2, a time period t1–t5 beginning with the turn-off time t1 is determined, during which the recognition of zero crossings is blocked. The corresponding blocking time t1–t5 for the zero crossing recognition is carried out by the coding out of a fixed counter state of the operational counter 21. The achieving of the fixed counter state is communicated to the terminal 52 of the control apparatus 34. The operational counter must hereby be reset at time t1.

After time t3, the oscillation in the switch-mode power supply transformer can decay far enough that no zero crossings are any longer detectable, and, as a consequence, the switching transistor 2 can no longer be turned on. In order nonetheless to provide a sure turning on of the switching transistor 2, the switching transistor is turned on without any further condition after the expiration of a time period appended to the time t3, if up to this point no zero crossing was recognizable due to the already-decayed oscillation. A corresponding time period is appended to the time t3 at the end of the masking time t2–t3. For this purpose, the counter state of the operational counter 21 is in turn monitored for the occurrence of a particular value by means of a corresponding coding logic, and the result is communicated to the control apparatus 34 at the terminal 52. For this purpose, at time t3 the control apparatus 34 must reset the operational counter 21.

Although various minor changes and modifications might be proposed by those skilled in the art, it will be understood that my wish is to include within the claims of the patent warranted hereon all such changes and modifications as reasonably come within my contribution to the art.

I claim as my invention:

1. A voltage converter for producing a controlled output voltage from an input voltage, comprising:

an inductive element connected between an input circuit and an output circuit, the inductive element also being connected with a switching element for pulse-by-pulse application of the input voltage to the inductive element;

a control circuit for driving the switching element to control the output voltage;

said control circuit having a first comparator whose output is connected to control said switching element and which has a first input connected to an output signal of a first digital counter unit and a second input connected with a digital comparison value derived from the output voltage via a second digital counter unit so that dependent on a comparison result, the switching element is turned off;

a circuit for generating at an output connected to said first digital counter unit a demagnetization signal indicating a state of demagnetization of the inductive element;

a comparison counter for creating a further comparison value, and a multiplexer circuit for feeding both the further comparison value and said digital comparison value derived from the output voltage to said second input of said comparator so that during determination of a low load operation, turning on of the switching element is first blocked and then released, dependent on a comparison result of said further comparison value with the output signal of the first digital counter unit.

2. The voltage converter according to claim 1 wherein the inductive element comprises a transformer with a primary winding to which said switching element is connected in series, said transformer also having a secondary winding for connecting to a load via a rectifier unit, and said control circuit for driving said switching element being constructed such that the switching element is turned on when a characteristic signal portion of a signal derived from a further transformer winding of said transformer via said demagnetization signal circuit occurs, said signal portion indicating said state of demagnetization of said transformer, and said switching element being turned off when said output signal of said first digital counter unit reaches said digital comparison value provided by said second digital counter unit.

3. The voltage converter according to claim 1 wherein said first digital counter unit is counted by a predetermined increment in a period formed by a turn-on phase and a turn-off phase of said switching element, and wherein a second comparator has an output connected to an input of said second digital counter unit and wherein a first input of said comparator is connected to a reference value and a second input of said second comparator is connected to a control voltage derived from a further winding of a transformer which comprises said inductive element.

4. The voltage converter according to claim 3 wherein a size of said increment of said second digital counter unit is greater for a period following a change of counting direction and for at least one subsequent period.

5. The voltage converter according to claim 1 wherein said demagnetization signal indicates a zero crossing, a memory element connected to said output of said first comparator which controls said switching element is set in order to turn on said switching element, said first digital counter unit being started, said first digital counter unit being clock-controlled by a reference clock-producing unit, and said memory element being reset when a counter state of said first digital counter unit reaches the comparison value output by said second digital counter unit.

6. The voltage converter according to claim 1 wherein said further comparison value generated by said comparison counter is compared with said output signal of said first digital counter unit when the second digital counter unit digital comparison value derived from the output voltage falls below a comparison threshold value input to said comparison unit.

7. The voltage converter according to claim 1 wherein said comparison counter has a counter state which is changed during a period by an increment in a first counting direction when a counter state of said second digital counter unit falls below a threshold comparison value, and is changed by an increment in a second opposed counting direction when the counter state of said second digital counter unit exceeds said threshold comparisoin value.

8. A voltage converter for producing a controlled output voltage from an input voltage, comprising:

a transformer having a primary connected to said input voltage and a secondary connected to provide said output voltage, said transformer having a further winding;

a switching element connected in series with said primary winding;

a control unit connected to control said switching element;

an output of said further winding connecting through a detection circuit to a first input of said control unit to provide a demagnetization signal and also via a rectifying circuit to a second input of said control unit to provide a control voltage;

said control unit comprising first and second comparators, a comparison unit, a multiplexer, first, and second digital counters, and a comparison counter;

said first counter providing a clock signal to a first input of said first comparator;

an output of said multiplexer connecting to a second input of said first comparator, an output of said first comparator connecting to control said switching element;

a first input of the multiplexer connecting via said second counter to said control voltage and also to a reference value, and said first input of said multiplexer also connecting to a first input of said comparison unit; and a second input of said comparator unit connecting to a comparison value and an output of said comparator unit connecting to a control circuit, the control circuit connecting to an input of said comparison counter, and an output of said counter unit connecting to a second input of said multiplexer.

9. The voltage converter according to claim 8 wherein an output of said first comparator connects through a memory element to said switching element.

10. The voltage converter according to claim 8 wherein the detection circuit comprises a zero crossing detection circuit connected at its input to an output of said further winding for providing a signal indicating state of demagnetization of the inductive element.

* * * * *